United States Patent [19]

Venzo

[11] 4,150,935
[45] Apr. 24, 1979

[54] APPARATUS FOR AUTOMATICALLY CUTTING, ROLLING AND DAMPENING PASTRY ROLLS

[76] Inventor: Dario Venzo, Via Camin 18, Schio (Vicenza), Italy

[21] Appl. No.: 708,879

[22] Filed: Jul. 26, 1976

[51] Int. Cl.² ............ A21C 9/08; A21C 11/10; A21C 11/22
[52] U.S. Cl. .................. 425/305.1; 83/110; 425/321
[58] Field of Search ............ 99/450.1, 450.6; 426/500–502, 138, 143, 514, 391; 425/319–322, 334, 391, 305.1; 83/110, 156; 156/195

[56] References Cited

U.S. PATENT DOCUMENTS

| 1,147,491 | 7/1915 | Embrey | 425/321 |
| 2,148,148 | 2/1939 | Broff | 425/334 |
| 3,845,679 | 11/1974 | Rhotert | 83/110 |

FOREIGN PATENT DOCUMENTS

| 121520 | 6/1946 | Australia | 425/321 |
| 502867 | 12/1954 | Italy | 425/321 |

*Primary Examiner*—Harvey C. Hornsby
*Assistant Examiner*—Timothy F. Simone
*Attorney, Agent, or Firm*—Bucknam and Archer

[57] ABSTRACT

An apparatus for automatically cutting, rolling and dampening pastry rolls, comprises means for feeding the dough, means for cutting the dough into strips, means for feeding the strips at an angle with respect to a conveyer belt which is located below said cutting means, means for rolling the strips of dough comprising tubes upon which the strips are wound and means for detaching the rolls from the tubes after they have been wound. All the motions are synchronized at suitable time intervals for all the steps in sequence.

9 Claims, 12 Drawing Figures

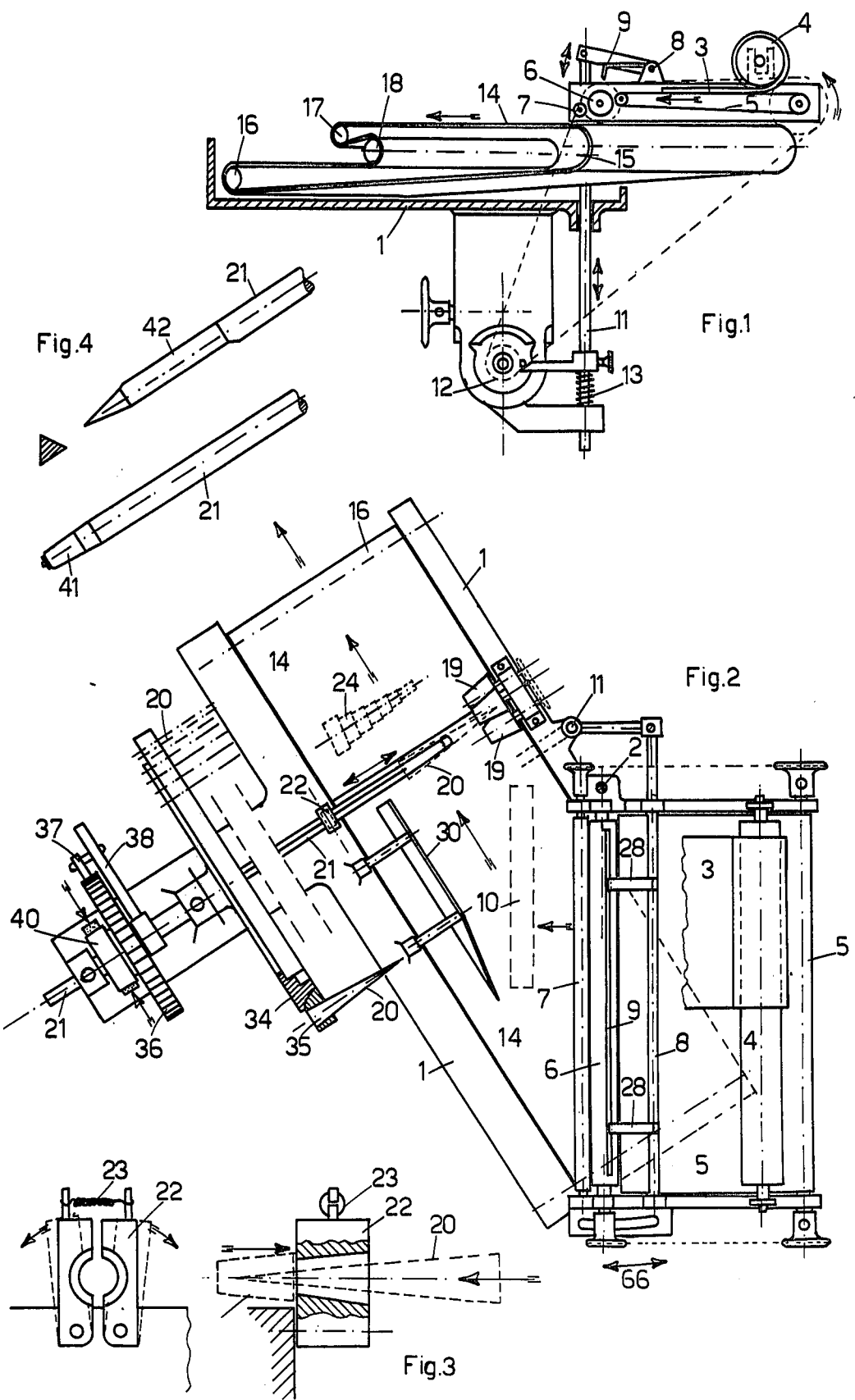

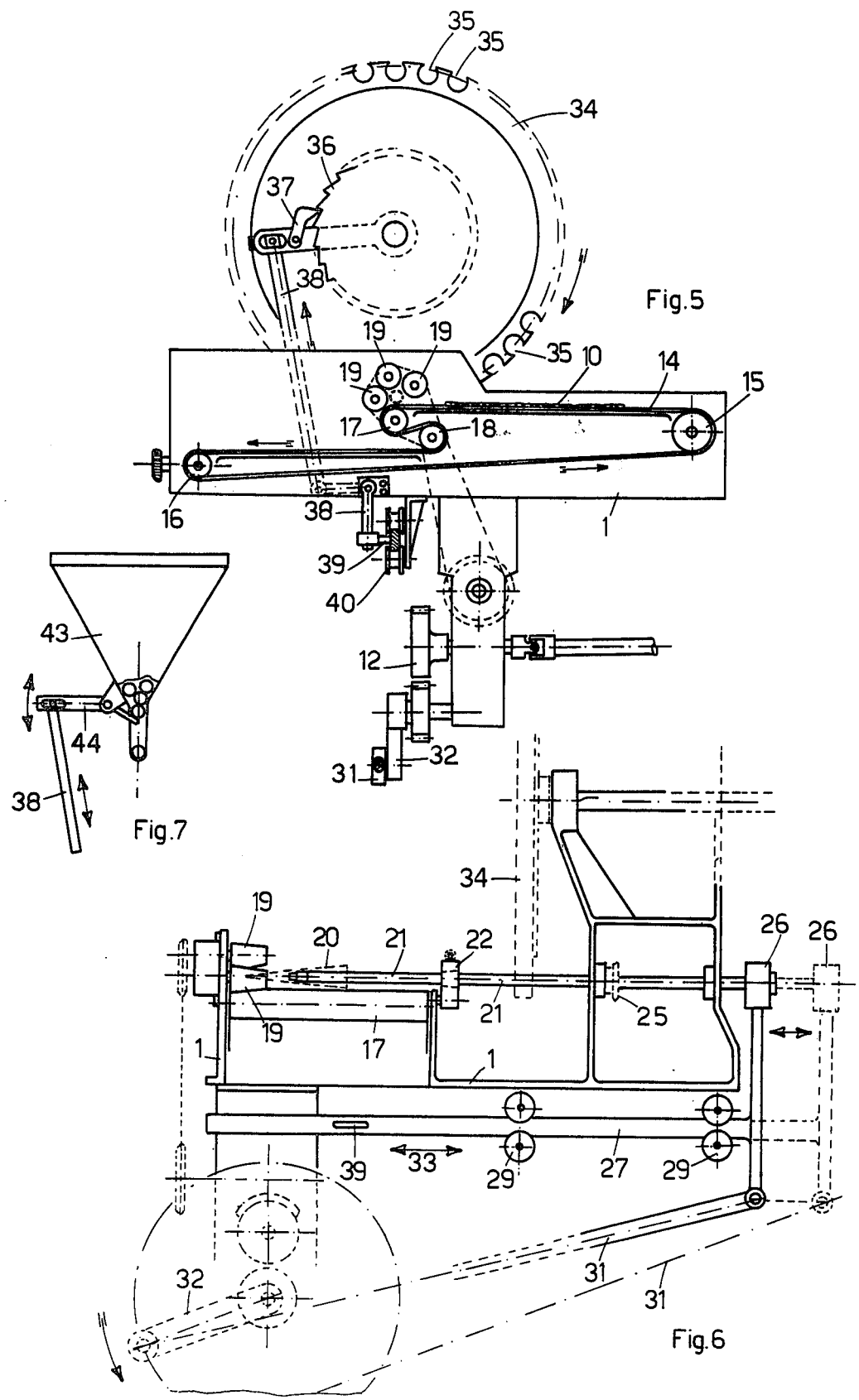

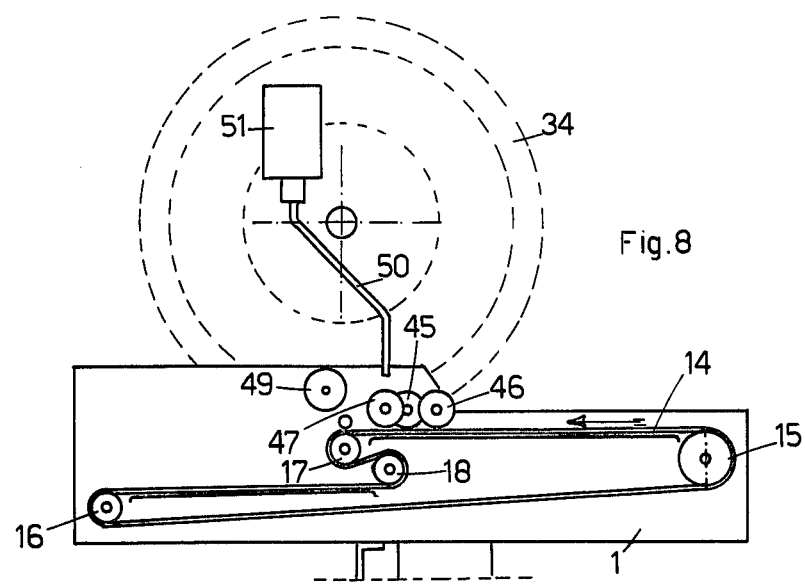
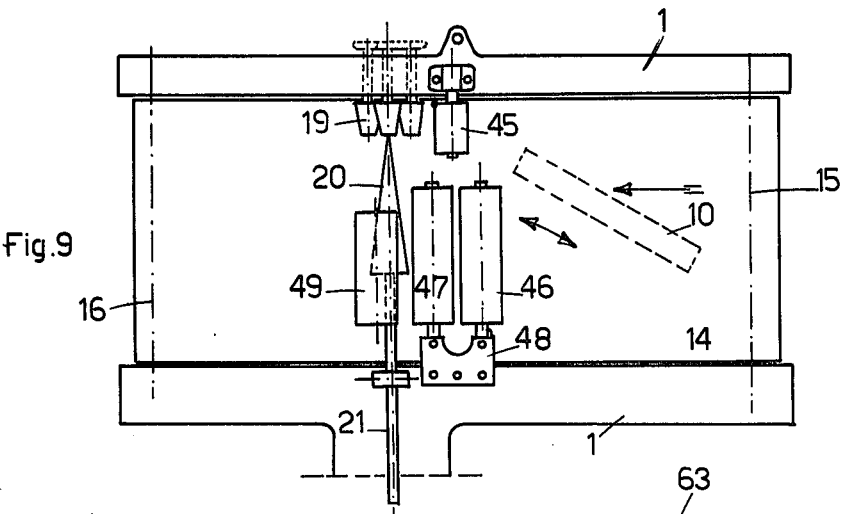
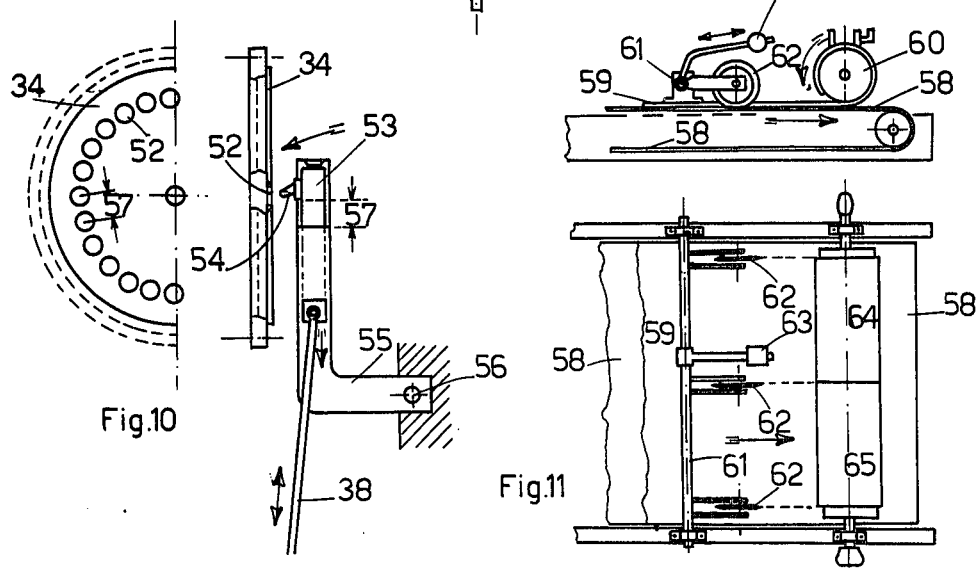

APPARATUS FOR AUTOMATICALLY CUTTING, ROLLING AND DAMPENING PASTRY ROLLS

The present invention relates to a machine to be used in the baking industry and more specifically a machine which automatically provides for cutting strips of laminated dough which is supported by a cylinder and immediately rolling the strips individually on a metallic tube, thus forming the well-known pastry rolls which then are introduced into the oven for baking.

The term "cannoli" as used herein indicates the well-known pastry rolls in the shape of cylindrical or conical tubes.

The apparatus according to the present invention comprises a feeding device provided with an automatic cutter which is arranged diagonally with respect to the remainder of the apparatus at an angle which may be varied. The apparatus also comprises a conveyer belt and an assembly of conical rotating rollers among which a shaft is inserted, the shaft supporting the metallic tube on which the strip of dough is initially wound and on which the winding is completed. The winding may be conical or cylindrical.

The apparatus also comprises an automatic distributor of metallic tubes and a device for automatically dampening the extremity of the cannoli after they have been formed. All the motions are synchronized at predetermined intervals in accordance with the requirements for all the steps required for the preparation of the finished cannoli.

The invention is illustrated by the accompanying drawings of which

FIG. 1 is a partial view of the feeding device provided with the conveyor belt and the cutter;

FIG. 2 is a plan view of the device showing the shaft which carries the individual pastry items and the conical rollers used for winding the individual pieces of dough;

Figure 12:
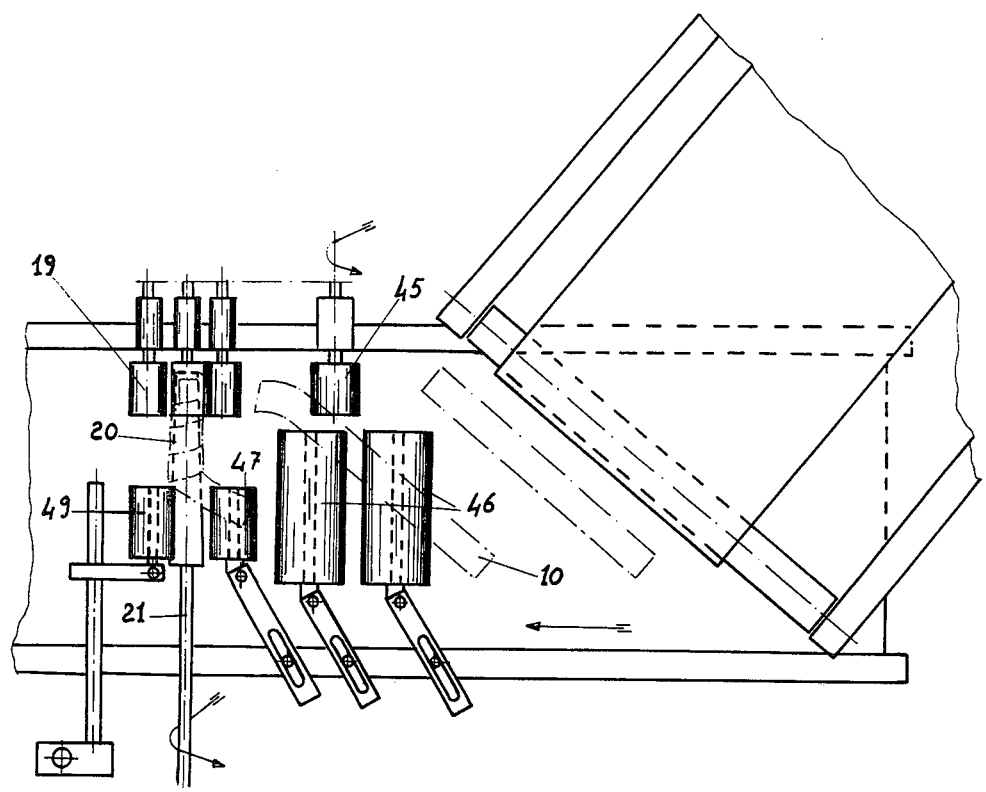

FIG. 3 which comprises two views illustrates the support for the shaft which also serves for removing the cannoli;

FIG. 4 illustrates the extremity of the shaft for rolls which may be conical as well as of cylindrical shape;

FIG. 5 is a side view of the conveyor belt, the conical rolls and also comprises a partial view of the wheel which supports the metallic tubes;

FIG. 6 is a transversal view of the apparatus showing the shaft which supports the rollers and also illustrates the axial movement used for taking up and removing the cannoli;

FIG. 7 illustrates one embodiment of a hopper used for holding and distributing the cylindrical metallic tubes;

FIG. 8 is a side view of a device showing the arrangement of the supplemental rollers and the device used for dripping water onto the pastry rolls;

FIG. 9 is a plan view of the conveyor belt with the rollers referred to hereinabove;

FIG. 10 illustrates in a schematic fashion one embodiment of the device used for the rotation of the disk which carries the metallic tubes at intervals;

FIG. 11 illustrates two views of the device used for the preparation of rolls of laminated dough.

FIG. 12 illustrates the manner of operation of the rollers in FIGS. 8 and 9.

By reference to the drawings and specifically FIGS. 1 and 2, numeral 3 designates the dough, and the device for feeding the dough is mounted on one side of the frame 1 of the apparatus on pivot 2. The feeding device comprises cylinder 4 which carries the dough 3 and conveyor belt 5, the latter running on suitable rollers. The adjacent roller 6 is mounted on the same frame, this roller 6 having the same peripheral velocity as conveyor 5. Roller 7 is also mounted on the same frame of the apparatus but it possesses a velocity superior to the velocity of roller 6.

The same frame supports shaft 8 which is provided with two elastic arms 28 which support the cutting knife 9. The latter acts upon roller 6 in such a manner that at suitable time intervals synchronized with the advance of the dough 3, it causes the cutting of the dough into strips as shown at 10 in FIG. 2.

This knife 9 is actuated by the shaft 11 as seen in FIG. 1, the latter having an arm alternately set in motion by the rotation of the wheel 12 by means of a suitable gear and pivot assembly, while the spring 13 which is carried by the shaft 11 makes the shaft of knife 9 rise.

In this manner as soon as the strip of laminated dough 10 has been cut, the strip is removed by adhesion in view of the fact that the cylinder 7 has a greater speed and the strip is deposited on conveyor belt 14 which is part of the lower part of the apparatus. It should be noted that the strip 10 is disposed on conveyor belt 14 in a direction diagonally with respect to roller 7.

Conveyor belt 14 is actuated by the terminal rollers 15 and 16 and is wound in the intermediate portion also on the two rollers 17 and 18 which may be seen in FIGS. 1-5 in such a manner that the conveyor belt 14 travels in the direction of the arrows in two different planes.

The three conical rollers 19 are located above roller 17 laterally. There three rollers, which are made of rubber, are used for winding the pastry rolls. As shown in the figures they are located very close one to the other and are operated with a peripheral velocity equal to that of the conveyor 14.

The metallic tube 20 is inserted partially among the three rollers 19, the metallic tube 20 being supported by the rotating shaft 21 in such a manner that as soon as the first portion of the strip 10 touches the tube 20, the three rollers 19 wind the strip and roll it on the tube, thus producing the desired pastry roll in the shape of a cannolo.

The arrow 66 in FIG. 2 illustrates the possibility of varying the inclination of the feeding device which is provided with the cutter on pivot 2. This inclination permits a variation in the angle of the strip of dough 10 with respect to the conveyor belt 14 and, therefore, the length of the pastry roll which is wound on the tube 20.

The metallic strip designated by numeral 30 in FIG. 2 is arranged perpendicularly with respect to the shaft 21 and along the conveyer belt 14. This strip serves as a support and the position may be adjusted. It serves the purpose of ensuring that the final winding of the strip 10 at the extremity is in the shape of a cylinder.

Shaft 21 not only rotates but also moves axially and reciprocates in the support 22 as shown in FIGS. 2, 3 and 6, support 22 being formed of two parts which are divergent and which are provided with a spring 23 in such a manner that when they spread apart, the metallic tube 20 which is inserted on the shaft 21, may go through the opening. Further, the support 22 stops the metallic tube 20 when the shaft 21 travels in the opposite direction as shown in FIG. 3 so that the cannolo 24 is detached and falls on the conveyor belt 14, after the cannolo 24 has been prepared as shown in FIG. 2. Finally, the cannolo 24 is discharged in a container for cooking.

The axial movement of the shaft 21 occurs at successive time intervals and is caused by the crank and connecting rods shown in FIG. 6. The shaft 21 in addition to rotating because of reel 25, is guided in the bearings of the frame of the apparatus and terminates in bearing 26 which is supported by an arm of rod 27, the latter traveling between rollers 29 which are located in a level lower than the frame of the apparatus. This rod 27 is actuated by crank 32 and connecting rod 31 and a suitable mechanical assembly causes the travel of the rod 27, at predetermined time intervals along the direction of the arrows 33 and consequently the travel of shaft 21 which supports the metallic tubes.

As shown in FIGS. 2-6, it is necessary that the shaft 21 with the metallic tube inserted thereon advance among the conical rollers 19 and it is necessary that it continue to rotate while in the same position until the entire strip 10 of the cannolo is wound. Immediately thereafter, due to the assembly of the crank 32 and connecting rod 31, the shaft 21 travels in the opposite direction, and stops against the support 22 in such a manner that the food roll in the form of a cannolo falls on the conveyer belt 14. The shaft 21 by traveling further back is ready to have another metallic tube in the shape of a cannolo inserted thereon the metallic tube being carried for instance by disk 34.

This disk 34 is shown in FIGS. 2-5 and may be made of metal or of plastic material. It is provided at the periphery with a great number of recesses 35 in which the conical metallic tubes are inserted.

Disk 34 also supports the toothed wheel 36 which is provided with pawl 37 and connecting rod 38 and is caused to rotate at intervals of the space corresponding to one tooth each time, only when shaft 21 and rod 27 travel in the backward stroke at the end of the travel. In this manner every time shaft 21 completes the backward stroke, disk 34 presents a new metallic tube in the shape of a cannolo in front of shaft 21, the new metallic tube being ready to be inserted in the shaft 21 in such a manner that after going over the support 22, it carries the metallic tube among rollers 19 for the purpose of receiving a new strip of dough 10.

The connecting rod 38 of pawl 37 is actuated by cam 39 as shown in FIGS. 5 and 6, the latter being supported by rod 27 which travels between rollers 29. The motion of the disk 34 which carries the metallic tubes is also controlled by the shoe brake 40 so that the disk may be stopped at the appropriate time.

For the purpose of making conical cannoli, conical metallic tubes are required and in this case the tip of the shaft 21 is tapered as shown by numeral 41 in FIG. 4, that is it forms a head made up of anti-friction elastic rubber. On the other hand, when the food rolls are in the shape of cylindrical cannoli, cylindrical metallic tubes are needed and the metallic tube 21 has a tip 42 which has a triangular cross section so that it may take the internal shape of the metallic tube. In the case of cylindrical cannoli, disk 34 with recesses 35 is not needed but the cylindrical metallic tubes are contained in the hopper 43 which is shown in FIG. 7 and which is provided with an oscillating device 44. This device is actuated by the connecting rod 38 and it lets one metallic tube fall at a time so that the tube is taken by the tip of the shaft 21. When the metallic tubes are conical, after the supply supported by the disk 34 has been exhausted, this disk is substituted by another load of metallic tubes.

For the purpose of better winding the strip of dough on the metallic tube carried by shaft 21, rollers 45, 46 and 47 are applied over conveyer belt 14. This embodiment is shown in FIGS. 8 and 9. These rollers are made up of rubber or similar material of appropriate hardness. Roller 45 which rotates supported by the conveyer belt 14 performs the function of guiding in precise manner the extremity of the strip of dough 10 under the three conical rollers 19 for the purpose of starting the winding up step. Rollers 46 and 47 have their axis pivoted on the support 48 as shown in FIG. 9 for the purpose of being oriented in the direction of the arrow. In this manner the strips of dough 10 may be guided in uniform manner while they are being wound on the metallic tube 20. Finally roller 49 performs the function of closing the extremity of the food roll which adheres to the metallic tube 20. This roller 49 is raised for the purpose of allowing the food roll in the shape of a cannolo to separate from shaft 21 when the shaft 21 travels in the backward stroke. In this manner one achieves a perfect winding of the strip of dough.

As seen in FIG. 8, a device is provided for the purpose of keeping the dough damp and specifically the tube 50 contains water supplied from the small reservoir 51 and this tube lets a small amount of water drip onto roller 47. It is possible to add to the water aromas or other substances as desired. This step of maintaining the strip of dough damp favors the final closing of the cannolo by means of the last roller 49.

As shown in FIGS. 2-5 for the purpose of imparting to the disk 34 which supports the metallic tubes 20 a rotation at intervals so that the shaft 21 may raise the cannoli one at a time, the embodiment illustrated in FIG. 10 is particularly suitable. According to this embodiment, disk 34 is provided with a plurality of orifices 52 along the circumference and the small pawl 53 is located in front of these orifices. Pawl 53 is provided with tooth 54. The Pawl 53 is mounted in the support shaft 55 which is pivoted in 56.

The pawl 53 is actuated by shaft 38 and may travel in the support 55 with small friction in the direction of the arrows: At first the shaft makes the support rotate a small amount so that the tooth 54 enters in one of the orifices 52. Immediately thereafter pawl 53 travels along the segment 57 and makes the disk 34 rotate a similar amount. This short rotation corresponds to the peripheral interval between two cannoli. For the purpose of stopping the disk 34 which supports the metallic tubes in the proper position at every interval, there is provided a disk with springs which enters in the several recesses corresponding to the positions of all the cannoli.

For the purpose of ensuring that the metallic tube 20 is held on shaft 21, even without additional restraining devices, the head 41 of shaft 21 as shown in FIG. 4 is provided with a permanent magnet.

The cylindrical cannoli are used for the purpose of producing the analogous cannoli of cylindrical shape; shaft 21 may be provided with a circular section and may be provided with a spring which may be expanded so that some friction is created within the metallic cannolo.

For the purpose of preparing the initial rolls of dough 4 which are mounted on the apparatus as shown in FIGS. 1 and 2 the embodiment illustrated in FIG. 11 is advantageous. The conveyor belt 58 is used, the sheet of dough 59 reaches the conveyor belt and is carried by the belt until it reaches a point under roll 60 which may freely turn within the supports of its axis and on which the dough 59 is wound. The transversal shaft 61 is mounted in front of the roller 60. This shaft supports the cutting disks 62 which are mounted in a perpendicular direction and are supported on supports of light weight. The cutting disks 62 serve the purpose of cutting the dough in strips. For the purpose of ensuring that these disks 62 exert the proper pressure on the sheet of dough 59 which runs under the disks 62, there is provided the weight 63 which maintains the adherence required for the cutting step. The weight 63 is mounted by means of an arm joined to the shaft 61 and the position of the weight may be adjusted.

By means of the three cutting rollers 62 it is possible to obtain two equal rolls of dough 64 and 65 as shown in FIG. 11 which may be used one at a time and may be fed to the apparatus of this invention.

Many variations of the apparatus of this application may be made always comprising the fundamental features of a feeding device for the laminated dough, a cutting device, means for locating the dough in a diagonal direction with respect to a conveyor belt in strips, means for immediately rolling the strips on metallic tubes which may be conical or cylindrical and which rotate and means for winding the strips comprising winding rollers and finally means for conveying the foodstuff called cannoli to the cooking zone.

What is claimed is:

1. An apparatus for automatically cutting and rolling cannoli from rolls of laminated dough which comprises a frame supporting a first conveyor belt, means for feeding said rolls of laminated dough on one side of the frame, means for cutting the rolls of laminated dough into strips supported by said frame, means for feeding said strips onto said first conveyor belt in a diagonal direction thereto, means for adjusting the inclination of said strips with respect to said conveyor belt, means for winding said strips in cylindrical cannoli, adjacent said means for feeding said strips, said first conveyor belt travelling on two first rollers located about the middle thereof and being supported by two additional terminal rollers whereby said conveyor belt travels on two different planes, the means for winding said strips which comprises three rollers located above said first two rollers and close one to the other and a rotating shaft which carries a metallic tube in the shape of a cannolo adapted to be inserted among said rollers, means for locating each strip of dough on said metallic tube and for guiding said strip of dough under said three rollers and for closing the extremity of said cannoli which comprise four rollers whereby the strip of dough is wound on said metallic tube by the action of said four rollers and means for detaching said strips after they have been wound.

2. The apparatus according to claim 1 wherein said frame supports a shaft having two arms, the means for cutting the rolls of dough into strips comprise a knife supported by said arms, means are provided for imparting to said knife a reciprocating motion, which is synchronized with said means for feeding the dough, whereby the dough is cut into strips at predetermined time intervals.

3. The apparatus according to claim 2 wherein said feeding means for the rolls of dough are located laterally with respect to said frame and comprise conveyor means for the dough, rollers mounted on said frame the first of said rollers rotating at the same speed as said conveyor means, the second roller rotating at a speed greater than said conveyor means, whereby said strips of dough are disengaged from said knife and are deposited on said first conveyor belt.

4. The apparatus according to claim 1 wherein the means for adjusting the inclination of said strips with respect to said first conveyor belt comprise means for adjusting said feeding means for the dough in a horizontal direction.

5. The apparatus according to claim 1 wherein said rotating shaft reciprocates within a support; said support having an opening of adjustable size; said shaft carrying the metallic tube in engagement with said three rollers in the forward stroke and when it travels in the backward stroke stopping against said support and causing the cannolo of dough to drop on the first conveyor belt in the lower plane thereof.

6. An apparatus according to claim 5 wherein the means for causing the axial reciprocating motion of said rotating shaft which carries the metallic tube comprise a rod, said rod being movable on rollers and being actuated by crank means.

7. An apparatus according to claim 1 which is provided with means for dripping water on top of one of said four rollers for the purpose of favoring the closure of the extremity of the cannolo.

8. An apparatus for automatically cutting and rolling cannoli from rolls of laminated dough which comprises a frame supporting a first conveyor belt, means for feeding said rolls of laminated dough on one side of the frame, means for cutting the rolls of laminated dough into strips, supported by said frame, means for feeding said strips onto said first conveyor belt in a diagonal direction thereto, means for adjusting the inclination of said strips with respect to said conveyor belt, means for winding said strips in cylindrical cannoli adjacent said means for feeding said strips, said first conveyor belt travelling on two first rollers located about the middle thereof and being supported by two additional terminal rollers whereby said conveyor belt travels on two different planes, the means for winding said strips which comprises three rollers located above said first two rollers and close one to the other, and a rotating shaft and a plurality of conical metallic tubes, a disk carries said conical metallic tubes among said three rollers, the disk rotates and the means for causing the disk to rotate comprise a ratchet assembly and cam means, the rotation of said disk at suitable time intervals causing each metallic tube to be inserted on said rotating shaft, said rotating shaft reciprocating within a support; said support having an opening of adjustable size, said shaft carrying the metallic tube in engagement with said three rollers in the forward stroke and when it travels in the backward stroke stopping against said support and causing the cannolo of dough to drop on the first conveyor belt in the lower plane thereof.

9. An apparatus according to claim 8 wherein said disk is provided with a plurality of peripheral orifices, a toothed pawl is adapted to enter one of said orifices whereby each metallic tube is placed in front of said shaft and spring means are provided for causing said pawl to engage with one of said orifices.

* * * * *